(12) United States Patent
Nanba

(10) Patent No.: US 10,561,903 B2
(45) Date of Patent: Feb. 18, 2020

(54) GOLF BALL

(71) Applicant: Bridgestone Sports Co., Ltd., Tokyo (JP)

(72) Inventor: Atsushi Nanba, Chichibushi (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 16/185,230

(22) Filed: Nov. 9, 2018

(65) Prior Publication Data

US 2019/0184237 A1    Jun. 20, 2019

(30) Foreign Application Priority Data

Dec. 20, 2017 (JP) ................. 2017-244020

(51) Int. Cl.
| | |
|---|---|
| *A63B 37/00* | (2006.01) |
| *A63B 43/06* | (2006.01) |
| *C08L 23/08* | (2006.01) |
| *A63B 102/32* | (2015.01) |

(52) U.S. Cl.
CPC ...... *A63B 37/0024* (2013.01); *A63B 37/0022* (2013.01); *A63B 37/0074* (2013.01); *A63B 37/0075* (2013.01); *A63B 43/06* (2013.01); *C08L 23/0876* (2013.01); *A63B 2102/32* (2015.10); *C08L 2205/03* (2013.01)

(58) Field of Classification Search
CPC ............ C08L 23/0876; C08L 23/0869; C08L 23/0846; C08L 23/0807; C08L 2205/03; A63B 37/12; A63B 37/0003; A63B 37/0023; A63B 37/0022; A63B 37/0074; A63B 37/0075; A63B 37/0076

See application file for complete search history.

(56) References Cited

U.S. PATENT DOCUMENTS

| | | | | |
|---|---|---|---|---|
| 5,367,028 A | * | 11/1994 | Hamada ............ | A63B 37/0003 473/377 |
| 5,725,443 A | * | 3/1998 | Sugimoto .......... | A63B 37/0003 428/447 |
| 8,864,605 B2 | | 10/2014 | Iizuka et al. | |
| 2008/0248897 A1 | * | 10/2008 | Morgan ............ | A63B 37/0003 473/371 |
| 2009/0325733 A1 | * | 12/2009 | Morken ............ | C08L 23/0876 473/378 |
| 2012/0035002 A1 | | 2/2012 | Iizuka et al. | |
| 2012/0122614 A1 | * | 5/2012 | Iizuka ............ | A63B 37/0013 473/385 |
| 2013/0137534 A1 | * | 5/2013 | Shiga ............ | A63B 37/0051 473/372 |
| 2013/0252765 A1 | * | 9/2013 | Komatsu .......... | A63B 37/0007 473/378 |
| 2015/0368452 A1 | * | 12/2015 | Nanba ............ | C08L 67/02 525/221 |
| 2017/0260377 A1 | * | 9/2017 | Nanba ............ | A63B 37/0059 |

FOREIGN PATENT DOCUMENTS

| | | |
|---|---|---|
| JP | 2012-034776 A | 2/2012 |
| JP | 2012-105725 A | 6/2012 |

* cited by examiner

*Primary Examiner* — John E Simms, Jr.
(74) *Attorney, Agent, or Firm* — Sughrue Mion, PLLC

(57) ABSTRACT

In a golf ball having a core of at least one layer and a cover of at least one layer, an outermost layer of the cover is formed of an ionomer resin composition which includes specific amounts of (a) an olefin-α,β-unsaturated carboxylic acid copolymer and/or a metal ion neutralization product thereof, or an olefin-α,β-unsaturated carboxylic acid-α,β-unsaturated carboxylic acid ester copolymer and/or a metal ion neutralization product thereof, (b) an oxazoline group-containing polymer, (c) an inorganic filler, and (d) a colorant which includes a fluorescent dye or a fluorescent pigment. This golf ball has a translucent appearance that holds down transparency of the ball surface to a suitable level and undergoes relatively little change in color when fading occurs due to sunlight exposure, and is thus both weather resistant and decorative.

10 Claims, No Drawings

GOLF BALL

CROSS-REFERENCE TO RELATED APPLICATION

This non-provisional application claims priority under 35 U.S.C. § 119(a) on Patent Application No. 2017-244020 filed in Japan on Dec. 20, 2017, the entire contents of which are hereby incorporated by reference.

Technical Field

This invention relates to golf balls having a core of at least one layer and a cover of at least one layer, and particularly to golf balls having a translucent outermost cover layer and an excellent weather resistance.

Background Art

A recent trend in the golf ball market has been the wide popularity of colored balls having a clear outermost layer. Such golf balls differ from conventional colored balls with an opaque outermost layer in that they are luminous and stylish. However, under strong light conditions, dimple-shaped shadows and light-reflecting effects may blur the image of the ball and make it difficult to address, adversely affecting play.

In the golf ball cover, various additives, such as titanium oxide and other white pigments, are typically included in the resin component consisting of an ionomer resin and the like. Efforts have been made to resolve the above problem by including an inorganic filler in the cover-forming resin material. However, when an inorganic filler is used in a cover-forming resin material to lower the transparency, a highly opaque appearance results. Also, in cases where a white pigment such as titanium oxide is added in order to minimize the transparency of the ball surface, because the titanium oxide reacts sensitively to light and heat, deterioration of the resin material itself tends to arise.

JP-A 2012-105725, JP-A 2012-34776 and other patent publications describe art relating to such golf balls. However, although these prior-art golf balls are colored golf balls having a bright, diaphanous hue, such a ball appearance readily incurs dimple-shaped shadows and light-reflecting effects, which may adversely affect play and may also increase the opacity, giving an appearance that lacks stylishness.

SUMMARY OF THE INVENTION

It is therefore an object of the present invention to provide a golf ball which has a translucent appearance that holds down transparency to a suitable degree and undergoes relatively little change in color when fading occurs due to sunlight exposure, making the ball both weather resistant and decorative.

As a result of extensive investigations, I have discovered that, in a golf ball having a core of at least one layer and a cover of at least one layer, by including the following in specific respective ranges within a resin composition: (a) an olefin-α,β-unsaturated carboxylic acid copolymer and/or a metal ion neutralization product thereof, or an olefin-α,β-unsaturated carboxylic acid-α,β-unsaturated carboxylic acid ester copolymer and/or a metal ion neutralization product thereof, (b) an oxazoline group-containing polymer, (c) an inorganic filler and (d) a colorant comprising a fluorescent dye or a fluorescent pigment, and having the resin composition form the outermost layer of the cover, there can be obtained a golf ball which has a translucent appearance that holds down transparency of the ball surface to a suitable level and undergoes relatively little change in color when fading occurs due to sunlight exposure, thus fully endowing the ball with both weather resistance and decorativeness.

Accordingly, in one aspect, the invention provides a golf ball having a core of at least one layer and a cover of at least one layer, wherein an outermost layer of the cover is formed of an ionomer resin composition which includes:

(a) 100 parts by weight of an olefin-α,β-unsaturated carboxylic acid copolymer and/or a metal ion neutralization product thereof, or an olefin-α,β-unsaturated carboxylic acid-α,β-unsaturated carboxylic acid ester copolymer and/or a metal ion neutralization product thereof, (b) from 0.05 to 10 parts by weight of an oxazoline group-containing polymer, (c) from 0 to 0.09 part by weight of an inorganic filler, and (d) from 0.001 to 3 parts by weight of a colorant comprising a fluorescent dye or a fluorescent pigment.

In a preferred embodiment of the golf ball of the invention, the outermost layer is translucent.

In another preferred embodiment of the inventive golf ball, the polymer of component (b) is an acrylic polymer or a styrene polymer. In this embodiment, the polymer of component (b) is more preferably a styrene polymer.

In yet another preferred embodiment, the ionomer resin composition further includes a non-ionomeric resin. The non-ionomeric resin is preferably selected from the group consisting of polyvinyl chloride, polypropylene, polystyrene, polyamide (nylon), polyacetal, polyvinylidene fluoride, polyphenylene sulfide, polyamide-imide, polyetheretherketone, polyimide, polytetrafluoroethylene (Teflon®), phenolic resin (Bakelite), unsaturated polyester, polyurethane, polyester elastomer, polyamide elastomer and styrene elastomer.

In a further preferred embodiment of the golf ball of the invention, the colorant is a light-harvesting fluorescent dye.

In a still further preferred embodiment of the inventive golf ball, the outermost layer has a paint film formed on an outer surface thereof, which paint film is made of a urethane paint containing an organic or inorganic filler.

In another preferred embodiment of the inventive golf ball, an intermediate layer is formed between the cover outermost layer and the core, which intermediate layer is white or yellow in color.

Advantageous Effects of the Invention

The golf ball of the invention has a translucent appearance which holds down the degree of transparency to a suitable level and undergoes relatively little change in color when fading occurs due to sunlight exposure, thus making the ball both weather resistant and decorative.

DESCRIPTION OF THE PREFERRED EMBODIMENTS

The objects, features and advantages of the invention will become more apparent from the following detailed description.

The golf ball of the invention has a core of at least one layer and a cover of at least one layer. The cover used in the invention is a member that encases the core and may have a plurality of layers. Examples of such covers include a two-layer cover and a three-layer cover. Each layer of the cover is called a cover layer. In particular, the inner side of the cover is sometimes called the intermediate layer and the outer side is called the outermost layer. In the case of a three-layer cover, the respective layers are sometimes called, in order from the inner side: the envelope layer, the intermediate layer and the outermost layer.

In this invention, the outermost layer of the cover is formed of an ionomer resin composition that includes:
(a) an olefin-α,β-unsaturated carboxylic acid copolymer and/or a metal ion neutralization product thereof, or an olefin-α,β-unsaturated carboxylic acid-α,β-unsaturated carboxylic acid ester copolymer and/or a metal ion neutralization product thereof,
(b) an oxazoline group-containing polymer,
(c) an inorganic filler, and
(d) a colorant that includes a fluorescent dye or a fluorescent pigment.

Components (a) to (d) are described below.

(a) Olefin-α,β-Unsaturated Carboxylic Acid Copolymer and Metal Ion Neutralization Product Thereof, Olefin-α,β-Unsaturated Carboxylic Acid-α,β-Unsaturated Carboxylic Acid Ester Copolymer and Metal Ion Neutralization Product Thereof Here, the olefin in component (a) is one in which the number of carbon atoms is typically at least 2, but not more than 8, and preferably not more than 6. Specific examples include ethylene, propylene, butene, pentene, hexene, heptene and octene. Ethylene is especially preferred. Examples of the unsaturated carboxylic acid in component (a) include acrylic acid, methacrylic acid, maleic acid and fumaric acid, with acrylic acid and methacrylic acid being especially preferred. The unsaturated carboxylic acid ester in component (a) is preferably a lower alkyl ester of the unsaturated carboxylic acid. Specific examples include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, i-butyl acrylate) is especially preferred.

The metal ion neutralization product of the copolymer of component (a) can be obtained by neutralizing some of the acid groups on the olefin-unsaturated carboxylic acid copolymer or olefin-unsaturated carboxylic acid-unsaturated carboxylic acid ester copolymer with metal ions. Illustrative examples of the metal ions which neutralize the acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Preferred use can be made of $Na^+$, $Li^+$, $Zn^{++}$, $Mg^{++}$ and $Ca^{++}$. Such a neutralization product may be obtained by a known method. For example, a neutralization product can be obtained by using, for the above copolymer, a compound such as a formate, acetate, nitrate, carbonate, bicarbonate, oxide, hydroxide or alkoxide of the above metal ion.

A known substance may be used as component (a). Illustrative examples include commercial products such as the following acid copolymers: Nucrel® N1560, N1214, N1035, AN4221C, AN4311, AN4318 and AN4319 (all products of DuPont-Mitsui Polychemicals Co., Ltd.). Illustrative examples of metal ion neutralization products of acid copolymers include Himilan 1554, 1557, 1601, 1605, 1706, AM7311, 1855, 1856 and AM7316 (all products of DuPont-Mitsui Polychemicals Co., Ltd.), and Surlyn® 7930, 6320, 8320, 9320 and 8120 (all products of E.I. DuPont de Nemours & Co.).

(b) Oxazoline Group-Containing Polymer

Component (b) is an oxazoline group-containing polymer. An acrylic polymer or a styrene polymer is especially preferred as the oxazoline group-containing polymer. The primary purpose of component (b) is to form chemical bonds by reaction of the oxazoline groups thereon with carboxyl groups on the ionomer resin of component (a). Translucency can be imparted in this way without a loss in the durability of the ionomer resin.

From the standpoint of compatibility with the ionomer, the oxazoline group content in the polymer of component (b) is preferably from $0.1\times10^{-3}$ to $10\times10^{-3}$ mol/g (solids basis), and especially from $0.2\times10^{-3}$ to $8\times10^{-3}$ mol/g (solids basis), per 1.0 g of the polymer.

The amount of component (b) included per 100 parts by weight of component (a) is from 0.05 to 10 parts by weight, and preferably from 0.5 to 3 parts by weight. When this amount falls outside of the above range, the desired appearance may not be obtained. Also, an amount of component (b) that is too large may adversely affect the resilience.

A commercial product may be used as the polymer of component (b). Examples include Epocros RPS 1005, the Epocros WS series and the Epocros K-2000 series, all of which are available from Nippon Shokubai Co., Ltd.

(c) Inorganic Filler

Examples of the inorganic filler (c) include, without particular limitation, zinc oxide, barium sulfate, calcium carbonate and titanium dioxide. From the standpoint of whiteness, titanium dioxide is preferred. Also, adding an inorganic filler makes it possible to confer translucency and to adjust the color.

The amount of component (c) added per 100 parts by weight of component (a) is from 0 to 0.09 part by weight, and preferably not more than 0.06 part by weight. When too much is added, the hiding properties may become excessive, detracting from the decorativeness of a ball that has a stylish feel, or the change in color when color fading occurs due to sunlight exposure may increase.

(d) Colorant Made of Fluorescent Dye or Fluorescent Pigment

This invention is directed at a colored golf ball whose surface is free of luster and leaves a quiet impression. A colorant is included for this purpose in the resin material used to form the outermost layer of the cover. Color is imparted to the outermost cover layer by suitably including a known fluorescent dye or fluorescent pigment as the colorant. The colorant is exemplified here by solvent yellow, solvent orange, anthraquinone and phthalocyanine (all of which are dyes), and by yellow fluorescent pigments, pink fluorescent pigments and orange fluorescent pigments. Commercial products known to the art may be used as these colorants.

In this invention, of the fluorescent colorants, the use of one that is light harvesting is preferred. Light-harvesting fluorescent colorants are materials which have the function of collecting sunlight and, as fluorescent light, converting the wavelength to the long-wavelength side. These materials, which are characterized by collecting light at the surface of a colored material and making intense fluorescent light at the dimple edges colored, have a maximum absorption wavelength band and a maximum excitation wavelength band that both exist within the visible light region.

Such light-harvesting fluorescent colorants include systems that generate orange, pink, red, yellow, blue or violet colors. Commercial products may be used in any of these chromogenic systems. Examples of light-harvesting fluorescent dyes that may be used include those available from BASF under the trade names Lumogen F Yellow 083, Lumogen F Orange 240, Lumogen F Red 305 and Lumogen F Blue 650.

The amount of component (d) included per 100 parts by weight of component (a) is from 0.001 to 3 parts by weight, and preferably from 0.005 to 0.5 part by weight. When this amount is low, the fluorescence may weaken and the desired decorativeness may not be obtained. On the other hand, when this amount is high, migration of the colorants, especially dyes, may arise, staining objects that come into contact with the golf ball.

The combined amount of components (a) to (d) is not particularly limited, although it is recommended that this account for at least 70 wt %, preferably at least 80 wt %, more preferably at least 90 wt %, and most preferably 100 wt %, of the total amount of the resin composition. When the amount included is too low, the desired effects of the invention may not be obtained.

A non-ionomeric resin may be included in the ionomer resin composition containing above components (a) to (d) in order for the outermost layer to exhibit translucency. This non-ionomeric resin is exemplified by thermoplastic resins selected from the group consisting of polyvinyl chloride, polypropylene, polystyrene, polyamide (nylon), polyacetal, polyvinylidene fluoride, polyphenylene sulfide, polyamide-imide, polyetheretherketone, polyimide, polytetrafluoroethylene (Teflon®), phenolic resin (Bakelite), unsaturated polyester and polyurethane; and thermoplastic elastomers such as polyester elastomers, polyamide elastomers and styrene elastomers.

In the practice of this invention, in order to have the golf ball appearance be translucent, it is preferable to make the outermost layer-forming resin material translucent. The reason is that, for instance, when an inorganic filler is used in the cover material to lower the transparency of the outermost cover layer, the appearance ends up having a high opacity. Alternatively, adding titanium dioxide in order to hold down the transparency tends to give rise to plastic deterioration because titanium dioxide is particularly sensitive to light and heat. Hence, rather than depending on the addition of an inorganic material in order to confer translucency, by instead adding a non-ionomeric resin such as any of those mentioned above, a resin composition containing as the base resin an ionomer resin having a high transparency can be rendered translucent. Making the resin material translucent in this way has the additional advantage of enabling the ball image and center of gravity to be readily grasped when the golfer addresses the ball. However, if the outermost layer is made completely opaque, this will result in an inferior ball appearance.

The amount of the non-ionomeric resin included in the ionomer resin composition is preferably from 1 to 10 parts by weight, and more preferably from 1 to 5 parts by weight, per 100 parts by weight of the ionomer resin of component (a).

The resin composition can be obtained by mixing together the above ingredients using, for example, any of various types of mixers, such as a kneading-type single-screw or twin-screw extruder, a Banbury mixer or a kneader.

Various additives may be optionally included in the resin composition. For example, pigments, dispersants, antioxidants, light stabilizers, ultraviolet absorbers and internal mold release agents may be suitably added.

The individual layers of the cover, including the outermost layer, have thicknesses which, although not particularly limited, are preferably at least 0.5 mm, and more preferably at least 0.7 mm, but preferably not more than 1.7 mm, more preferably not more than 1.2 mm, and even more preferably not more than 0.9 mm.

The individual layers of the cover, including the outermost layer, have hardnesses on the Shore D scale which, although not particularly limited, are preferably at least 30, more preferably at least 40, but preferably not more than 75, more preferably not more than 70, and even more preferably not more than 65.

A known method may be used without particular limitation as the method of forming the individual layers of the cover, including the outermost layer. For example, use can be made of a method in which a prefabricated core or a prefabricated sphere composed of the core encased by one or more cover layer is placed within a mold, and the resin material prepared as described above is injection molded over the core or layer-encased sphere.

Numerous dimples of one or more type may be formed on the surface of the cover. In addition, various types of paint may be coated onto the cover surface. Given the need for the golf ball to be capable of withstanding harsh conditions of use, this paint is preferably a two-part curable urethane paint, with the use of a non-yellowing urethane paint being especially preferred. For a matte coating in particular, the use of a urethane paint which includes an organic or inorganic filler is preferred. The organic or inorganic filler is exemplified by silica fillers, melamine fillers and acrylic fillers, and may be included in an amount of preferably from 2 to 30 parts by weight per 100 parts by weight of the paint composition.

Ball specifications such as the ball weight and diameter may be suitably set in accordance with the Rules of Golf.

EXAMPLES

The following Working Examples and Comparative Examples are provided to illustrate the invention, and are not intended to limit the scope thereof.

Working Examples 1 to 4, Comparative Examples 1 to 7

A resin composition was prepared for each of Working Examples 1 to 4 and Comparative Examples 1 to 7 according to the formulation shown in Table 1 below.

As shown in Table 1, a solid core was produced in each Example by using the following rubber compositions, which is common to all the Examples, and vulcanizing for 15 minutes at 155° C.

TABLE 1

| Rubber composition for core (C1) | Parts by weight |
| --- | --- |
| cis-1,4-Polybutadiene | 100 |
| Zinc acrylate | 27 |
| Zinc oxide | 4.0 |
| Barium sulfate | 16.5 |
| Antioxidant | 0.2 |
| Organic peroxide (1) | 0.6 |
| Organic peroxide (2) | 1.2 |
| Zinc salt of pentachlorothiophenol | 0.3 |
| Zinc stearate | 1.0 |

Details on the above core materials are given below.
cis-1,4-Polybutadiene: Available under the trade name "BRO1" from JSR Corporation
Zinc acrylate: Available from Nippon Shokubai Co., Ltd.
Zinc oxide: Available from Sakai Chemical Co., Ltd.
Barium sulfate: Available from Sakai Chemical Co., Ltd.
Antioxidant: Available under the trade name "Nocrac NS-6" from Ouchi Shinko Chemical Industry Co., Ltd.
Organic Peroxide (1): Dicumyl peroxide, available under the trade name "Percumyl D" from NOF Corporation Organic Peroxide (2): A mixture of 1,1-di(tert-butylperoxy)cyclohexane and silica, available under the trade name "Perhexa C-40" from NOF Corporation Zinc stearate: Available from NOF Corporation Formation of Cover Layers (Intermediate Layer and Outermost Layer)

Next, an intermediate layer-encased sphere was produced by injection-molding the intermediate layer-forming resin material shown in Table 2 below, which is common to all the Examples, to a thickness of 1.45 mm over the 37.3 mm diameter core obtained as described above.

TABLE 2

| Intermediate layer-forming resin material (parts by weight) | Common to all Examples |
|---|---|
| HPF 2000 | 100 |
| White pigment | 2.7 |
| Yellow pigment | 0.12 |

Details on the materials in the table are given below. The intermediate layer-forming resin material was light yellow in color.

HPF 2000: An ionomer resin material available from E.I. DuPont de Nemours & Co.

White pigment: titanium dioxide

Yellow pigment: organic yellow pigment

Next, a three-piece golf ball having a ball diameter of 42.7 mm was manufactured by injection-molding the outermost layer-forming material (cover material) shown in Table 3 below to a thickness of 1.25 mm over the intermediate layer-encased sphere. A two-part curable urethane paint was used as the paint. A common dimple configuration was formed at this time on the surface of the cover in each Working Example and Comparative Example.

Fluorescent dye: A yellow dye available as Sumiplast Yellow FL7G from Sumika Chemtex Co., Ltd.

The golf balls obtained in the respective Working Examples and Comparative Examples were rated by the following methods for transparency and weather resistance (color fading resistance). The results are presented in Table 3.

Transparency

The above resin compositions were molded into 2 mm thick sheets, and the sheets were placed on top of white paper having clearly visible black lettering in an 11-point font written thereon. The transparency was evaluated according to the following criteria based on the appearance of the lettering.

Appearance:
Clearly visible: 1 point (rated as transparent)
Blurred but discernible: 2 points (rated as translucent)
Blurred and not discernible: 3 points (rated as translucent)
Not visible: 4 points (rated as opaque)

Weather Resistance

Using the SX75 Super Xenon Weather Meter from Suga Test Instruments Co., Ltd., the ball surface was irradiated for three cycles, each cycle consisting of 18 minutes of irradiation under rainfall and 102 minutes of irradiation at a xenon arc lamp irradiance of 180 W/$m^2$. Testing was carried out in an environment having a black panel temperature of 63° C. and 50% humidity. The change in color of the ball surface before and after xenon arc lamp irradiation was measured using a color difference meter (model SC-P) from Suga Test Instruments Co., Ltd. The change in color ΔE of the ball before and after irradiation was determined based on Lab color measurement in accordance with JIS Z 8701. When ΔE exceeds 5, color fading is clearly apparent on visual examination, and so the weather resistance is rated as poor.

TABLE 3

| | | | Comp. Example 1 | Working Example 1 | Working Example 2 | Comp. Example 2 | Working Example 3 | Working Example 4 | Comparative Example 3 | Comparative Example 4 | Comparative Example 5 | Comparative Example 6 | Comparative Example 7 |
|---|---|---|---|---|---|---|---|---|---|---|---|---|---|
| Outermost layer (pbw) | (a) | Himilan 1601 | 50 | 50 | 50 | 50 | 50 | 50 | 50 | 50 | 50 | 50 | 50 |
| | | Himilan 1557 | 50 | 50 | 50 | 50 | 50 | 50 | 50 | 50 | 50 | 50 | 50 |
| | (b) | Oxazoline group-containing styrene elastomer | | 1 | 2 | | 1 | 2 | | | | | 2 |
| | (c) | Titanium dioxide | | | | | | | 0.14 | 0.14 | 2.8 | 2.8 | 2.8 |
| | (d) | Light-harvesting fluorescent dye: red | 0.1 | 0.1 | 0.1 | | | | 0.1 | | 0.1 | | 0.1 |
| | | Fluorescent dye: yellow | | | | 0.1 | 0.1 | 0.1 | | 0.1 | | 0.1 | |
| Evaluation | | Transparency (score) | 1 | 2 | 3 | 1 | 2 | 3 | 3 | 3 | 4 | 4 | 4 |
| | | Weather resistance, ΔE | 1.2 | 2.7 | 3.3 | 2.2 | 3.5 | 3.9 | 5.1 | 6.0 | — | — | — |

Details on the outermost layer-forming material in Table 3 are given below.

Himilan®: an ionomer resin available from DuPont-Mitsui Polychemicals Co., Ltd.

Oxazoline-containing styrene elastomer:
The styrene polymer available from Nippon Shokubai Co., Ltd. as Epocros® RPS1005 (oxazoline group content, 0.27 mmol/g (solids); glass transition temperature, 109° C.; number-average molecular weight (Mn), 70,000; weight-average molecular weight (Mw), 160,000)

Light-harvesting fluorescent dye:
a red dye available as OPTABIADRED from SAMWON INDUSTIAL The weather resistance (ΔE) in Comparative Examples 5 to 7 was not evaluated because the outermost layer was opaque.

As shown in Table 3, the golf balls in each of Working Examples 1 to 4 had a ball appearance that exhibited translucency and also had an excellent weather resistance. By contrast, the golf balls in Comparative Examples 1 and 2 lacked translucency and the golf balls in Comparative Examples 3 and 4 had a ball surface that was translucent but of poor weather resistance. The golf balls in Comparative Examples 5, 6 and 7 had a high opacity and a poor appearance.

Japanese Patent Application No. 2017-244020 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core of at least one layer and a cover of at least one layer, wherein an outermost layer of the cover is formed of a resin composition comprising:
   (a) 100 parts by weight of an olefin-$\alpha,\beta$-unsaturated carboxylic acid copolymer or a metal ion neutralization product thereof or both, or of an olefin-$\alpha,\beta$-unsaturated carboxylic acid-$\alpha,\beta$-unsaturated carboxylic acid ester copolymer or a metal ion neutralization product thereof or both,
   (b) from 0.05 to 3 parts by weight of an oxazoline group-containing acrylic polymer or an oxazoline group-containing styrene polymer,
   (c) from 0 to 0.09 part by weight of an inorganic filler, and
   (d) from 0.001 to 3 parts by weight of a colorant comprising a fluorescent dye or a fluorescent pigment.

2. The golf ball of claim 1, wherein the outermost layer is translucent.

3. The golf ball of claim 1, wherein the polymer of component (b) is a styrene polymer.

4. The golf ball of claim 1, wherein the resin composition further comprises a non-ionomeric resin other than the component (a) and the component (b).

5. The golf ball of claim 4, wherein the non-ionomeric resin is selected from the group consisting of polyvinyl chloride, polypropylene, polystyrene, polyamide (nylon), polyacetal, polyvinylidene fluoride, polyphenylene sulfide, polyamide-imide, polyetheretherketone, polyimide, polytetrafluoroethylene (Teflon®), phenolic resin (Bakelite), unsaturated polyester, polyurethane, polyester elastomer, polyamide elastomer and styrene elastomer.

6. The golf ball of claim 1, wherein the colorant is a light-harvesting fluorescent dye.

7. The golf ball of claim 1, wherein the outermost layer has a paint film formed on an outer surface thereof, which paint film comprises a urethane paint containing an organic or inorganic filler.

8. The golf ball of claim 1, wherein an intermediate layer is formed between the outermost layer of the cover and the core, which intermediate layer is white or yellow in color.

9. The golf ball of claim 1, wherein the amount of an inorganic filler serving component (c) is 0 part by weight.

10. The golf ball of claim 1, wherein the resin composition does not include polyamide (nylon).

* * * * *